(12) United States Patent
Tsai et al.

(10) Patent No.: US 7,482,293 B2
(45) Date of Patent: Jan. 27, 2009

(54) OPTICAL GLASS SUITABLE FOR MOLD FORMING AT LOW TEMPERATURE

(75) Inventors: Tsung-yuen Tsai, Taichung (TW); Hsiang-jen Shih, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 11/756,441

(22) Filed: May 31, 2007

(65) Prior Publication Data

US 2008/0032879 A1 Feb. 7, 2008

(30) Foreign Application Priority Data

Jun. 12, 2006 (TW) .............................. 95120810 A

(51) Int. Cl.
*C03C 3/21* (2006.01)
*C03C 3/12* (2006.01)
*C03C 3/253* (2006.01)
*C03C 3/16* (2006.01)

(52) U.S. Cl. ............................ 501/46; 501/42; 501/45; 501/41

(58) Field of Classification Search .................. 501/45, 501/46, 42
See application file for complete search history.

(56) References Cited

U.S. PATENT DOCUMENTS

| 6,333,282 | B1 * | 12/2001 | Nakahata et al. | 501/45 |
| 7,309,670 | B2 * | 12/2007 | Fujiwara et al. | 501/46 |
| 2003/0220182 | A1 * | 11/2003 | Izuki | 501/46 |
| 2005/0192174 | A1 * | 9/2005 | Yamamoto et al. | 501/45 |
| 2007/0042891 | A1 * | 2/2007 | Ritter et al. | 501/46 |

* cited by examiner

*Primary Examiner*—Jerry Lorengo
*Assistant Examiner*—Noah S Wiese

(57) ABSTRACT

An optical glass suitable for mold forming at a low temperature including, in percent by weight, 9-25 percent of $P_2O_5$, 1-20 percent of $GeO_2$, 12-28 percent of $Nb_2O_5$, 1-7 percent of $TiO_2$, 0-55 percent of $Bi_2O_3$, 0-38 percent of $WO_3$, 0-3 percent of $SiO_2$, 0-5 percent of $B_2O_3$, 0-2 percent of $Al_2O_3$, 0-5 percent of $Li_2O$, 0-11 percent of $Na_2O$, 0-5 percent of $K_2O$, 0-3 percent of $Ta_2O_5$, 0-1 percent of $Sb_2O_3$, at most 13 percent of at least one $R_2O$ selected from the group consisting of $Li_2O$, $Na_2O$ and $K_2O$, and at most 15 percent of at least one XO selected from the group consisting of CaO, SrO, BaO and ZnO. The optical glass essentially contains no environmental and human harmful components, facilitates mass production and is stable against devitrification near its softening temperature.

11 Claims, No Drawings

OPTICAL GLASS SUITABLE FOR MOLD FORMING AT LOW TEMPERATURE

BACKGROUND OF THE INVENTION

1. Field of the Invention

The present invention relates to an optical glass suitable for mold forming, and particularly relates to an optical glass suitable for mold forming at a low temperature, the optical glass exhibiting a high refractive index and high dispersion property.

2. Description of Prior Art

Currently, the performance requirements for photoelectric products, such as digital cameras, are continually increased, and the dimensions of these products are also required to be further reduced. To meet these requirements, aspheric materials and high refractive index materials must be employed in an optical system design. Within the methods for manufacturing an aspheric lens, the grinding and polishing method not only consumes time, reduces productivity, but increases cost as well. Therefore, the precision press molding technology has now become a major and necessary technology for aspheric lens manufacture.

Japanese Patent Unexamined Publication Nos. 7-247135 and 10-316448 each disclose a molded optical glass having a low glass transformation temperature. The components of the optical glass of Japanese Patent Unexamined Publication No. 7-247135 contain a large amount of lead oxide, PbO. However, precision press molding is ordinarily conducted at a high temperature and in a nonreactive atmosphere or a weakly reducing atmosphere to prevent mold oxidation. When the glass components containing large amounts of lead oxide are precision pressed, lead oxide is reduced on the glass surface and precipitates onto the glass surface as metallic lead. Further, with repeated press molding, the precipitating metallic lead adheres to the molding surface of the mold, decreasing the precision of the molding surface and eventually causing loss of the surface precision of the transfer surface of the molded product. Thus, maintenance is required to remove the metallic lead adhering to the mold, compromising mass production. In addition, the use of poisonous components such as PbO, CdO, $As_2O_3$ or $TeO_2$ tends to be avoided lately from optical glasses in view of stringent environmental protection requirements, and thus it is not preferred to use. Japanese Patent Unexamined Publication No. 10-316448 discloses an optical glass containing Tellurium Dioxide, $TeO_2$, that is also poisonous to the human body and therefore it is advisable to avoid the use of $TeO_2$ in the glass component.

In the case of known mold materials for precision molding, there arises a problem that the higher is the precision molding temperature, the more is oxidation or deterioration of the mold material, thus resulting in difficulty in maintenance of the surface accuracy of the mold material and in mass production of lenses by the precision molding. Accordingly, to effectively increase the service life of a mold, the precision molding temperature should be reduced.

On the other hand, the precision molding is generally carried out at a high temperature range of about 30-60° C. above the yield point temperature (At) of the glass. When the yield point temperature of the glass exceeds 590° C., the press temperature becomes 620° C. or greater. Thus, OH material adhering to the surface of the glass reacts with the mold material and ends up decomposing. This decomposition reaction leaves numerous bubbles on the surface of glass lenses that are formed by press molding. Thus, not only does it become difficult to maintain the degree of precision of the transfer surface of the optical part being precision molded, damage is done to the surface precision of the mold material, compromising mass production. Therefore, to ensure mass production, the yield point temperature of the glass should be as lower as possible and at least lower than 590° C.

Among the optical glasses currently available on the market, there are various high refractive index, high dispersion glasses that are disclosed in, for example, Japanese Patent Laid-open Nos. 2001-058845, 2002-173336 and 2003-160355. The high refractive index, high dispersion glass disclosed by Japanese Patent Laid-open No. 2001-058845 has a high liquid phase temperature, and the glass viscosity during precision molding is so low that texture grows in the resultant glass. Further, when manufacturing an optical glass having a high refractive index and high dispersion, there are unavoidable problems in that the glass devitrifies during the manufacturing process and the yield drops. In particular, when employing the reheating press method, devitrification of the glass is marked. This devitrified glass is unsuitable for use in optical elements such as lenses. The high refractive index, high dispersion glass disclosed by Japanese Patent Laid-open No. 2003-160355 has a strong tendency to devitrify or lose transparency near its softening point, thus making it difficult to manufacture glass performs for precision pressing and rendering this glass unsuitable for precision pressing.

Table 1 that is given below shows the glass components, the refractive index (Nd), the Abbe number (vd), the glass transformation temperature (Tg), the yield point temperature (Ts) and the liquid phase temperature (LT) for optical glasses that are disclosed in Japanese Patent Publication Nos. 2002-173336, 2001-058845 and 1996-157231.

TABLE 1

| | No. | | |
|---|---|---|---|
| | JP 2002-173336 | JP 2001-58845 | JP 1996-157231 |
| | Weight Percentage (wt %) | | |
| Component | | | |
| $P_2O_5$ | 19.11 | 23.00 | 27.80 |
| $B_2O_3$ | 2.34 | 0.00 | 0.00 |
| $Li_2O$ | 2.41 | 3.00 | 2.00 |
| $Na_2O$ | 4.17 | 8.00 | 7.30 |
| $K_2O$ | 1.90 | 0.00 | 0.00 |
| SrO | 1.40 | 0.00 | 0.00 |
| BaO | 6.19 | 6.00 | 5.00 |
| ZnO | 3.84 | 0.00 | 2.60 |
| $Bi_2O_3$ | 0.00 | 10.00 | 0.00 |
| $TiO_2$ | 0.00 | 0.00 | 6.60 |
| $Nb_2O_5$ | 0.00 | 0.00 | 39.80 |
| $WO_3$ | 31.32 | 38.00 | 5.00 |
| $GeO_2$ | 27.32 | 12.00 | 0.00 |
| $Ta_2O_5$ | 0.00 | 0.00 | 0.00 |
| $Sb_2O_3$ | 0.00 | 0.00 | 0.00 |
| nd | 1.84703 | 1.84913 | 1.8442 |
| | Characteristic Values | | |
| vd | 23.93 | 23.55 | 21.40 |
| Tg | 471.8 | 472.3 | 552 |
| Ts | 522.8 | 510.7 | 602 |
| LT | 955 | 965 | — |
| Devitrification | Yes | No | — |

From the above Table 1, it can be seen that the optical glass of Japanese Patent Laid-open No. 2002-173336 loses transparency near its softening point; has a high liquid phase temperature; and thus may develop undesired textures therein. The optical glass of Japanese Patent Laid-open No. 2001-058845 also has a high liquid phase temperature, and thus develops undesired textures therein. The optical glass of Japanese Patent Laid-open No. 1996-157231 has a high glass transformation temperature, which is adverse to the service life of a precision molding mold.

SUMMARY OF THE INVENTION

The object of the present invention is to provide an optical glass suitable for mold forming at a low temperature, being free of environmental and human harmful components, and providing high stability against devitrification near its softening point as well as an improved mass production property.

To achieve the above object of the present invention, vast studies has been conducted for experiments on high refractive index, high dispersion optical glasses to develop a glass capable of being subjected to molding at a low temperature. These studies have led to a finding that the glass components as defined below provides an improved optical glass that is high in refractive index and dispersion, and has good chemical durability, low transformation temperature, low liquid phase temperature and high stability against devitrification. Further, the glass can be prepared in mass production. In a preferred embodiment, the optical glass in accordance with the present invention comprising, in percent by weight, 9-25 percent of $P_2O_5$, 1-20 percent of $GeO_2$, 12-28 percent of $Nb_2O_5$, 1-7 percent of $TiO_2$, 0-55 percent of $Bi_2O_3$, 0-38 percent of $WO_3$, 0-3 percent of $SiO_2$, 0-5 percent of $B_2O_3$, 0-2 percent of $Al_2O_3$, 0-5 percent of $Li_2O$, 0-11 percent of $Na_2O$, 0-5 percent of $K_2O$, 0-3 percent of $Ta_2O_5$, 0-1 percent of $Sb_2O_3$, and at most 15 percent of XO (X representing Ca, Sr, Ba and Zn), wherein the sum of $Li_2O$, $Na_2O$ and $K_2O$ does not exceed 13 percent.

The present optical glass has a refractive index of at least 1.82, an Abbe number of at most 26, a glass transformation temperature of at most 480° C. and a liquid phase temperature of at most 880° C. Further, the present optical glass is stable against devitrification near its softening temperature, and is suitable for industrial scale mass production. In addition, no environmental and human harmful component, such as PbO, CdO, As2O 3 and TeO2, is applied in the present invention.

DETAILED DESCRIPTION OF THE PREFERRED EMBODIMENT

In a preferred embodiment in accordance with the present invention, the major components of an optical glass in accordance with the present invention include $P_2O_5$, $GeO_2$, $Nb_2O_5$, $TiO_2$, $Bi_2O_3$, $WO_3$, $SiO_2$, $B_2O_3$, $Al_2O_3$, $Li_2O$, $Na_2O$, $K_2O$, $Ta_2O_5$ and $Sb_2O_3$.

The components of the present optical glass are selected for the reasons stated below. In the following description, the content ranges of the respective components are expressed in weight percentage.

The component $P_2O_5$ is an essential component and is the major ingredient for composing a network structure of glass. It allows the glass to melt and form at a lower temperature. It has been found that the use of $P_2O_5$ less than 9 percent results in a strong devitrification tendency to render the glass unstable, whereas the use of $P_2O_5$ greater than 25 percent results in a low refractive index. The preferred range is 10 to 24 percent.

The component $GeO_2$ is an essential component and is the major ingredient for composing a network structure of glass similar to $P_2O_5$. It is effective for increasing the refractive index of glass. If the amount of $GeO_2$ is below 1 percent, the refractive index increasing effect is not remarkable, while if more than 20 percent, the glass transformation temperature is increased. The preferred range is 2 to 17 percent.

The component $Nb_2O_5$ is an essential and effective component for high refractive index, high dispersion glass, and also contributes to increase of chemical durability of glass. If the amount of $Nb_2O_5$ is less than 12 percent, the desired high refractive index cannot be obtained, whereas if more than 28 percent, the glass transformation temperature is increased, resistance to devitrification is deteriorated and the coloring property in the ultraviolet spectral region is also deteriorated. The preferred range is 13 to 27 percent.

The component $TiO_2$ is an essential and effective component for high refractive index, high dispersion glass, and also contributes to increase of chemical durability and devitrification resistance of glass. Addition in a proper amount also helps to decrease the liquid phase temperature. An amount of less than 1 percent is insufficient to attain the above-described advantages. On the contrary, if the $TiO_2$ content exceeds 7 percent, the produced glass is unstable against devitrification and is strongly colored.

The component $Bi_2O_3$ is an important and effective component for increasing the refractive index and dispersion, and decreasing the glass transformation temperature and liquid phase temperature. If the amount of $Bi_2O_3$ exceeds 55 percent, glass stability becomes poor.

The component $WO_3$ is an additive component and is effective for increasing the refractive index and decreasing the liquid phase temperature. If exceeding 38 percent, the coloring property in the ultraviolet spectral region is deteriorated. Preferably, the amount of $WO_3$ does not exceed 37 percent.

The component $SiO_2$ is an additive component and is the ingredient for composing a network structure of glass similar to $P_2O_5$. It also contributes to increase of chemical durability and fluid viscosity of the glass. However, if it is added in an amount more than 3 percent, unmelted matter is easily formed during melting and thus the melting temperature must be increased.

The component $B_2O_3$ is an additive component and is the ingredient for composing a network structure of glass similar to $P_2O_5$. It is also effective for obtaining a homogeneous glass. However, if it is more than 5 percent, the glass stability sharply drops.

The component $Al_2O_3$ is an additive component contributing to increase of chemical durability and fluid viscosity of the glass. When it exceeds 2 percent, resistance to devitrification will be deteriorated. Preferably, the amount of $Al_2O_3$ is less than 1.5 percent.

The components $Li_2O$, $Na_2O$ and $K_2O$ are additive components. When added in a proper amount, both the melting temperature and liquid phase temperature of the glass can be decreased. However, if the sum of $Li_2O$, $Na_2O$ and $K_2O$ exceeds 13 percent, it is impossible to obtain a glass with desired high refractive index, and resistance to devitrification becomes poor.

Specifically, if the amount of $Li_2O$ or $K_2O$ exceeds 5 percent, resistance to devitrification is deteriorated. Preferably, the amount of $Li_2O$ or $K_2O$ does not exceed 4 percent. If the amount of $Na_2O$ exceeds 11 percent, desired high refractive index cannot be obtained and resistance to devitrification becomes poor. Preferably, the amount of $Na_2O$ does not exceed 10 percent.

The components CaO, SrO, BaO and ZnO are additive components. When they added in a proper amount, the liquid phase temperature can be decreased and the resistance to devitrification can be increased. These components are also effective for adjusting the optical constants of the glass. However, if the sum of CaO, SrO, BaO and ZnO exceeds 15 percent, it is impossible to obtain a glass with desired high refractive index, and resistance to devitrification becomes poor.

The component $Ta_2O_5$ is an additive and effective component for high refractive index, high dispersion glass, and also contributes to increase of chemical durability of glass. However, if the amount of $Ta_2O_5$ exceeds 3 percent, the resistance to devitrification is deteriorated.

The component $Sb_2O_3$ is an additive component acting as a defoaming agent and a decoloring agent. When it exceeds 1 percent, the coloring property and resistance to devitrification are deteriorated.

The present optical glass can be prepared in a manner as provided below. Using the corresponding $H_3PO_4$, metaphosphate, carbonates, nitrates and oxides, etc., as a raw material of each component, the component compositions are first weighed and adequately mixed in a prescribed proportion. These materials are then charged in a quartz crucible or platinum crucible, covered, and melted at a temperature of 1000° C. to 1200° C. The molten mixture is homogenized and refined by stirring, clarified and defoamed, and then poured into a preheated mold for forming. Then, the resulting glass is subjected to annealing at about the glass transformation temperature, and is gradually cooled to the room temperature, to obtain a thermally stable optical glass. The thus-obtained optical glass is then measured for the refractive index (nd), the Abbe number (vd), the glass transformation temperature (Tg), the yield point temperature (Ts) and the liquid phase temperature (LT) as follows. Tables 2 and 3 show the results.

Refractive index (nd) and Abbe number (vd): The optical glass is maintained at the glass transformation temperature for a period of time, cooled at a temperature-decrease rate of −10° C./hour for 100° C., and then rapidly cooled to the room temperature. The measurement is carried out by using a refractometer (KPR-200, Kalnew).

Glass transformation temperature (Tg) and yield point temperature (Ts): The glass is grinded into a cylinder of 5 mm in diameter and 20 mm in length. The measurement is carried out by using a differential scanning calorimeter (BURKER type), at a temperature-increase rate of 5° C./min.

Liquid phase temperature (LT): The measurement is carried out by using a temperature gradient furnace. The glass samples are placed in a platinum boat within the gradient furnace over a wide range of temperature 500° C.-1000° C. and held for the required time. After cooled, the inside of each glass is observed through a microscope having a magnification of 100 times for the presence or absence of a crystal, on the basis of which the liquid phase temperature is determined.

Tables 2 and 3 as below show compositions of the present optical glass in weight percentage, and the thermal properties (glass transformation temperature (Tg), yield point temperature (Ts), Liquid phase temperature (LT)), optical properties (refractive index (nd), Abbe number (vd)) and devitrification test results of the resulting glasses.

TABLE 2

| Component | Sample 1 | Sample 2 | Sample 3 | Sample 4 | Sample 5 | Sample 6 |
|---|---|---|---|---|---|---|
| | Weight Percentage (wt %) | | | | | |
| $P_2O_5$ | 23.40 | 10.90 | 20.80 | 10.79 | 16.20 | 10.90 |
| $B_2O_3$ | 2.00 | 2.00 | 0.66 | 3.96 | 2.66 | 4.00 |
| $Li_2O$ | 3.10 | 1.82 | 2.85 | 1.80 | 2.85 | 1.82 |
| $Na_2O$ | 8.20 | 0.22 | 6.66 | 0.22 | 6.66 | 0.22 |
| $K_2O$ | 0.00 | 0.37 | 0.00 | 0.37 | 0.00 | 0.37 |
| BaO | 0.00 | 1.29 | 5.70 | 1.28 | 11.20 | 1.29 |
| ZnO | 2.20 | 0.00 | 0.00 | 0.00 | 0.00 | 0.00 |
| $Bi_2O_3$ | 21.20 | 50.00 | 10.00 | 47.52 | 0.00 | 47.00 |
| $TiO_2$ | 2.00 | 2.00 | 2.70 | 3.96 | 3.70 | 2.00 |
| $Nb_2O_5$ | 24.70 | 14.40 | 25.35 | 16.24 | 17.35 | 16.40 |
| $WO_3$ | 11.20 | 2.00 | 23.27 | 3.96 | 37.37 | 3.00 |
| $GeO_2$ | 2.00 | 15.00 | 2.00 | 10.89 | 2.00 | 13.00 |
| $Ta_2O_5$ | 0.00 | 0.00 | 0.00 | 0.00 | 0.00 | 0.00 |
| $Sb_2O_3$ | 0.00 | 0.10 | 0.20 | 0.10 | 0.20 | 0.10 |
| Characteristic Values | | | | | | |
| nd | 1.82489 | 1.96765 | 1.85490 | 2.00638 | 1.82684 | 1.97605 |
| vd | 24.33 | 20.21 | 23.16 | 19.87 | 25.07 | 20.81 |
| Tg | 428.10 | 459.4 | 466.40 | 470.3 | 459.70 | 460.9 |
| Ts | 471.50 | 501.7 | 518.30 | 517.6 | 498.20 | 497.4 |
| LT | 775 | 855 | 855 | 865 | 820 | 845 |
| Devitrification | No | No | No | No | No | No |

TABLE 3

| Component | Sample 7 | Sample 8 | Sample 9 | Sample 10 | Sample 11 | Sample 12 |
|---|---|---|---|---|---|---|
| | Weight Percentage (wt %) | | | | | |
| $P_2O_5$ | 10.90 | 23.10 | 20.16 | 21.79 | 18.40 | 22.27 |
| $B_2O_3$ | 4.00 | 0.00 | 0.36 | 0.74 | 0.66 | 0.74 |
| $Li_2O$ | 1.82 | 2.10 | 2.96 | 2.09 | 2.85 | 2.09 |
| $Na_2O$ | 0.22 | 9.20 | 7.36 | 9.07 | 6.66 | 8.52 |

TABLE 3-continued

| Component | Sample 7 | Sample 8 | Sample 9 | Sample 10 | Sample 11 | Sample 12 |
|---|---|---|---|---|---|---|
| | Weight Percentage (wt %) | | | | | |
| $K_2O$ | 0.37 | 0.00 | 0.00 | 0.37 | 0.00 | 0.37 |
| BaO | 1.29 | 0.00 | 6.11 | 0.00 | 9.70 | 0.00 |
| ZnO | 0.00 | 2.20 | 1.00 | 2.19 | 0.00 | 2.19 |
| $Bi_2O_3$ | 46.00 | 19.20 | 15.09 | 22.99 | 0.00 | 21.11 |
| $TiO_2$ | 4.00 | 4.30 | 3.43 | 4.74 | 3.70 | 4.28 |
| $Nb_2O_5$ | 16.40 | 24.70 | 22.33 | 18.94 | 22.05 | 20.93 |
| $WO_3$ | 4.00 | 13.20 | 19.20 | 14.90 | 33.97 | 15.30 |
| $GeO_2$ | 11.00 | 2.00 | 2.00 | 1.99 | 2.00 | 1.99 |
| $Ta_2O_5$ | 0.00 | 0.00 | 0.00 | 0.00 | 0.00 | 0.00 |
| $Sb_2O_3$ | 0.10 | 0.20 | 0.20 | 0.20 | 0.20 | 0.20 |
| | Characteristic Values | | | | | |
| nd | 2.00042 | 1.85270 | 1.84667 | 1.84797 | 1.84183 | 1.85016 |
| vd | 19.98 | 22.56 | 23.56 | 22.79 | 23.92 | 22.76 |
| Tg | 470.6 | 454.90 | 451.40 | 440.20 | 474.50 | 442.10 |
| Ts | 518.6 | 502.20 | 498.20 | 487.10 | 518.80 | 490.70 |
| LT | 865 | 850 | 855 | 865 | 880 | 840 |
| Devitrification | No | No | No | No | No | No |

Examples 1-12 given in Tables 2 and 3 show that the specific combination of these components can bring about preferred properties, such as a high refractive index in the range of 1.824-2.006, a high-dispersion Abbe number in the range of 19-23, a glass transformation temperature of at most 480° C. and a liquid phase temperature of at most 880° C., which are suitable for molded optical glass. Further, the present optical glass is stable against devitrification near its softening temperature.

Within the scope of the present invention the following glass composition (in percent by weight) is preferred because of higher stability against devitrification, lower liquid phase temperature and lower glass transformation temperature: 9-25 percent of $P_2O_5$, 1-20 percent of $GeO_2$, 12-28 percent of $Nb_2O_5$, 1-7 percent of $TiO_2$, 0-55 percent of $Bi_2O_3$, at most 13 percent of at least one $R_2O$ selected from the group consisting of $Li_2O$, $Na_2O$ and $K_2O$, and at most 15 percent of at least one XO selected from the group consisting of CaO, SrO, BaO and ZnO.

Under the above defined preferred glass composition, the following glass composition (in percent by weight) is particularly preferred for its further higher stability against devitrification, lower liquid phase temperature and lower glass transformation temperature as well as further higher chemical durability: 9-25 percent of $P_2O_5$, 1-20 percent of $GeO_2$, 12-28 percent of $Nb_2O_5$, 1-7 percent of $TiO_2$, 0-55 percent of $Bi_2O_3$, 0-38 percent of $WO_3$, 0-3 percent of $SiO_2$, 0-5 percent of $B_2O_3$, 0-2 percent of $Al_2O_3$, 0-5 percent of $Li_2O$, 0-11 percent of $Na_2O$, 0-5 percent of $K_2O$, 0-3 percent of $Ta_2O_5$, 0-1 percent of $Sb_2O_3$, and at most 15 percent of XO (X representing Ca, Sr, Ba and Zn), wherein the sum of $Li_2O$, $Na_2O$ and $K_2O$ does not exceed 13 percent.

As described above, the present optical glass has a refractive index of at least 1.82, an Abbe number of at most 26, a glass transformation temperature of at most 480° C. and a liquid phase temperature of at most 880° C. Further, the present optical glass is stable against devitrification near its softening temperature, and is suitable for industrial scale mass production. In addition, no environmental and human harmful components, such as PbO, CdO, $As_2O_3$ or $TeO_2$, is applied in the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical glass at least comprising, in percent by weight, 9~25 percent of $P_2O_5$, 1~20 percent of $GeO_2$, 12~28 percent of $Nb_2O_5$, 2~7 percent of $TiO_2$, 0~55 percent of $Bi_2O_3$, at most 13 percent of at least one $R_2O$ selected from the group consisting of $Li_2O$, $Na_2O$ and $K_2O$, and at most 15 percent of at least one XO selected from the group consisting of CaO, SrO, BaO and ZnO.

2. The optical glass as claimed in claim 1 exhibiting a refractive index of at least 1.82, an Abbe number of at most 26, a glass transformation temperature of at most 480° C. and a liquid phase temperature of at most 880° C.

3. The optical glass as claimed in claim 1 essentially not comprising environmental and human harmful components.

4. The optical glass as claimed in claim 3 essentially not comprising PbO, CdO, $As_2O_3$ and $TeO_2$.

5. The optical glass as claimed in claim 1 further comprising 0~38 weight percent of $WO_3$.

6. The optical glass as claimed in claim 5 further comprising 0~3 weight percent of $SiO_2$, 0~2 weight percent of $Al_2O_3$ or 0~5 weight percent of $B_2O_3$.

7. The optical glass as claimed in claim 6 further comprising 0~3 weight percent of $Ta_2O_5$.

8. The optical glass as claimed in claim 7 further comprising 0~1 weight percent of $Sb_2O_3$.

9. An optical glass comprising, in percent by weight, 9~25 percent of $P_2O_5$, 1~20 percent of $GeO_2$, 12~28 percent of $Nb_2O_5$, 2~7 percent of $TiO_2$, 0~55 percent of $Bi_2O_3$, 0~38 percent of $WO_3$, 0~3 percent of $SiO_2$, 0~5 percent of $B_2O_3$, 0~2 percent of $Al_2O_3$, 0~5 percent of $Li_2O$, 0~11 percent of $Na_2O$, 0~5 percent of $K_2O$, 0~3 percent of $Ta_2O_5$, 0~1 percent of $Sb_2O_3$, and at most 15 percent of at least one XO selected from the group consisting of CaO, SrO, BaO and ZnO, wherein the sum of $Li_2O$, $Na_2O$ and $K_2O$ does not exceed 13 percent.

10. The optical glass as claimed in claim 9 exhibiting a refractive index of at least 1.82, an Abbe number of at most 26, a glass transformation temperature of at most 480° C. and a liquid phase temperature of at most 880° C.

11. The optical glass as claimed in claim 9 essentially not comprising PbO, CdO, $As_2O_3$ and $TeO_2$.

* * * * *